(12) United States Patent
Hershey et al.

(10) Patent No.: US 10,165,398 B2
(45) Date of Patent: Dec. 25, 2018

(54) GEOFENCING FOR WIRELESS COMMUNICATIONS

(71) Applicant: General Electric Company, Schenectady, NY (US)

(72) Inventors: John Erik Hershey, Ballston Lake, NY (US); Michael Joseph Dell'Anno, Clifton Park, NY (US); Michael James Hartman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 95 days.

(21) Appl. No.: 15/245,014

(22) Filed: Aug. 23, 2016

(65) Prior Publication Data

US 2018/0063674 A1    Mar. 1, 2018

(51) Int. Cl.
*H04W 4/02* (2018.01)
*H01Q 19/06* (2006.01)
(Continued)

(52) U.S. Cl.
CPC ............ *H04W 4/021* (2013.01); *H01Q 1/241* (2013.01); *H01Q 1/246* (2013.01); *H01Q 15/02* (2013.01);
(Continued)

(58) Field of Classification Search
CPC . H04W 4/021; H04W 64/006; H04W 72/046; H04W 72/08; H04W 88/08; H04B 7/0408; H04B 7/086; H04B 7/0617; H04B 10/11; H01Q 1/241; H01Q 15/02
USPC .................. 455/13.3, 24–25, 63.4, 418–420, 455/450–452.1, 562.1; 370/252, 278, 370/282, 329, 334; 375/267
See application file for complete search history.

(56) References Cited

U.S. PATENT DOCUMENTS 5,047,776 A    9/1991    Baller
5,548,294 A    8/1996    Sturza
(Continued)

FOREIGN PATENT DOCUMENTS

WO    2015006756 A1    1/2015

OTHER PUBLICATIONS

Park, Young-Jin, et al.; "Offset cylindrical reflector antenna fed by a parallel-plate Luneburg lens for automotive radar applications in millimeter-wave", IEEE Transactions on Antennas and Propagation, vol. 51, Issue: 9, pp. 2481-2483, Sep. 2003.
(Continued)

*Primary Examiner* — Michael Y Mapa
(74) *Attorney, Agent, or Firm* — GE Global Patent Operation; Nitin Joshi

(57) ABSTRACT

The present disclosure relates to a system includes a Luneburg lens antenna system configured to selectively provide wireless communication to a plurality of stations, and one or more sensors configured to collect data related to an occupancy status of each of the plurality of stations. The system also includes a controller coupled to the Luneburg lens antenna system and the one or more sensors, wherein the controller is configured to determine the occupancy status of each of the plurality of stations based on the data collected by the one or more sensors, and the controller is further configured to change operation of the Luneburg lens antenna system based on the occupancy status of each of the plurality of stations.

21 Claims, 4 Drawing Sheets

(51) Int. Cl.
*H01Q 1/24* (2006.01)
*H04B 10/11* (2013.01)
*H01Q 15/02* (2006.01)
*H01Q 21/06* (2006.01)
*H04W 4/021* (2018.01)

(52) U.S. Cl.
CPC ............ *H01Q 19/062* (2013.01); *H04B 10/11* (2013.01); *H01Q 21/065* (2013.01)

(56) References Cited

U.S. PATENT DOCUMENTS

| | | | |
|---|---|---|---|
| 7,345,618 B1* | 3/2008 | Cole | G01S 13/32 |
| | | | 342/22 |
| 7,400,304 B2 | 7/2008 | Lewis et al. | |
| 8,854,257 B2 | 10/2014 | Hamner et al. | |
| 8,855,553 B2 | 10/2014 | Duerksen | |
| 2009/0225740 A1* | 9/2009 | Ku | H04B 7/204 |
| | | | 370/345 |
| 2013/0235807 A1* | 9/2013 | Lee | H04W 16/28 |
| | | | 370/329 |
| 2014/0097957 A1* | 4/2014 | Breed | G08B 21/06 |
| | | | 340/576 |
| 2015/0070230 A1 | 3/2015 | Bradley et al. | |
| 2015/0180120 A1* | 6/2015 | Pietraski | H01Q 15/0086 |
| | | | 342/368 |
| 2015/0382262 A1* | 12/2015 | Cho | H04W 4/02 |
| | | | 370/331 |
| 2016/0011053 A1* | 1/2016 | Katz | G01J 5/025 |
| | | | 250/338.3 |
| 2017/0026916 A1* | 1/2017 | Velu | H04W 52/283 |

OTHER PUBLICATIONS

Lafond, O., et al.; "Active reconfigurable Luneburg lens at 60GHz", 2015 9th European Conference on Antennas and Propagation (EuCAP), pp. 1-4, May 13-17, 2015, Lisbon.

* cited by examiner

GEOFENCING FOR WIRELESS COMMUNICATIONS

BACKGROUND

The subject matter disclosed herein relates to wireless communications, and more specifically to geofencing for WiFi communications.

Geofencing, a practice of confining a wireless link to a specific and limited volume, is desirable in many aspects. For example, geofencing may provide privacy (e.g., social and/or business privacy), reduce potential interference in a multi-user wireless environment, and provide more efficient use of transmitter power since the sufficient power to provide a particular communications link is not significantly spread beyond the locus of the intended receiver. Attempts to provide geofencing for wireless data communications (e.g., Wi-Fi communications) have entailed the combination of directional antennas, power control, and coding techniques using a plurality of access points. However, in certain situations, there may be no convenient way to provide a plurality of access points (e.g., complexity due to location, channel selection, and interference between multiple access points, etc.). Accordingly, there is a need for techniques and systems that can provide geofencing using only a single access point.

BRIEF DESCRIPTION

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In one embodiment, a system includes a Luneburg lens antenna system configured to selectively provide wireless communication to a plurality of stations, and one or more sensors configured to collect data related to an occupancy status of each of the plurality of stations. The system also includes a controller coupled to the Luneburg lens antenna system and the one or more sensors, wherein the controller is configured to determine the occupancy status of each of the plurality of stations based on the data collected by the one or more sensors, and the controller is further configured to change operation of the Luneburg lens antenna system based on the occupancy status of each of the plurality of stations.

In another embodiment, a system includes a Luneburg lens antenna system configured to selectively provide wireless communication to the plurality of stations, and an optical system adjacent to the Luneburg lens antenna system, including one or more sensors configured to collect data related to an occupancy status of each of the plurality of stations. The system also includes a memory and a processor configured to execute instruction stored on the memory comprising instructions for determining the occupancy status of each of the plurality of stations, and changing operation of the Luneburg lens antenna system based on the occupancy status of each of the plurality of stations.

In another embodiment, a method for providing geofencing in single access point wireless communication includes determining an occupancy status of each of a plurality of stations based on data collected via one or more sensors, and changing operation of a Luneburg lens antenna system based on the occupancy status of each of the plurality of stations.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
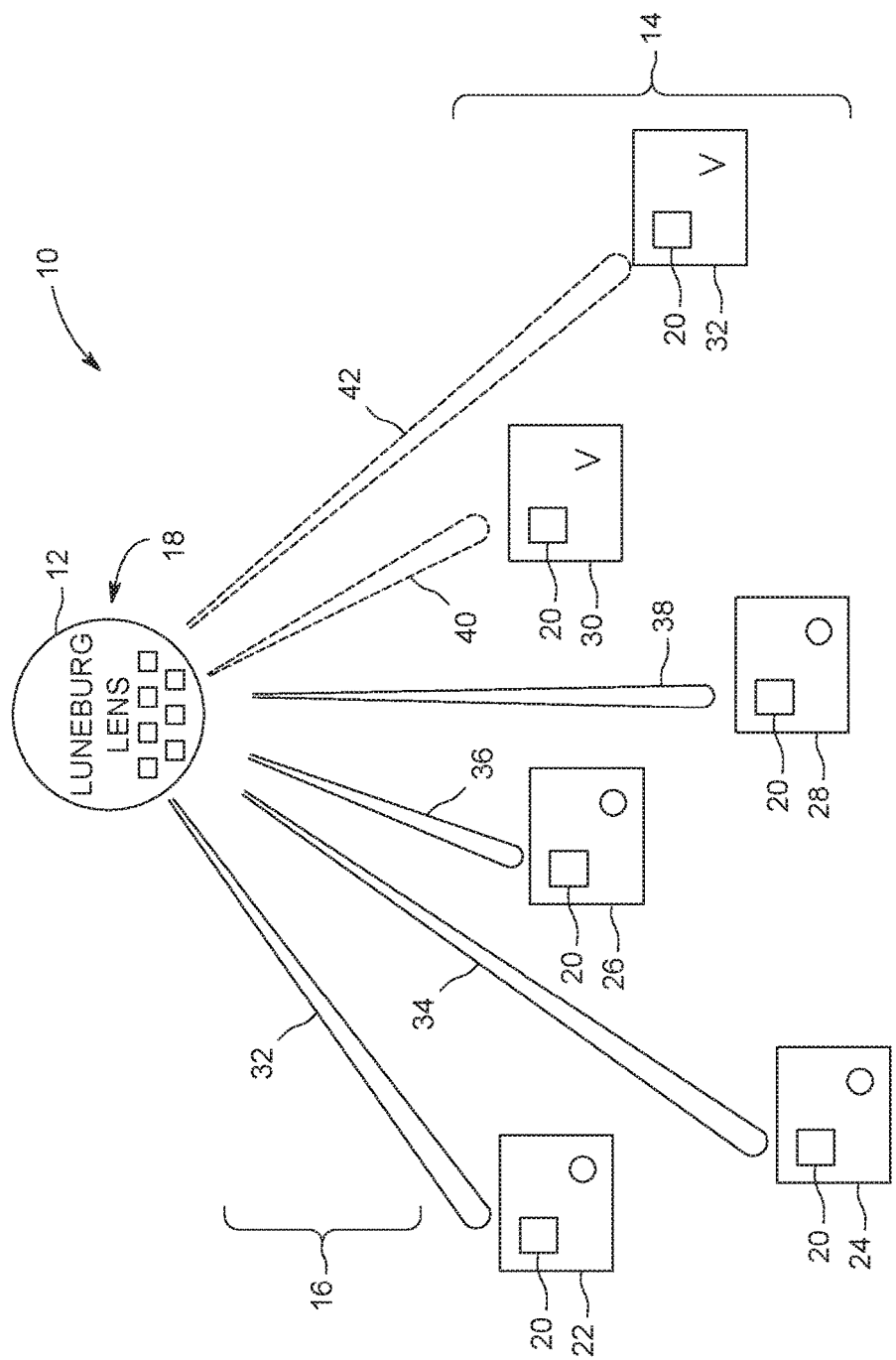
FIG. 1 is a schematic of a wireless geofencing system for a plurality of communication links provided by a single access point, in accordance with an aspect of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The opportunity to conduct license-free communications at 60 gigahertz (GHz) has facilitated the continued development in wireless communications. The 60 GHz industrial, scientific, and medical radio (ISM) band offers 7 GHz of continuous spectrum and presents many operational advantages such as narrow beam width, oxygen absorption for interference immunity and privacy operation, gigabit-plus data rates, high allowable transmit power, etc. In particular, the characteristic of the significant attenuation rate due to oxygen absorption may be about 14 decibel (dB) per kilometer at sea level. While this feature of the band may inhibit single long distance link applications, it may be beneficial for privacy, geofencing, and non-interference applications.

In addition, at 60 GHz, a small aperture antenna can yield small beamwidths, which may also help to improve the efficiency of geofencing.

With this in mind, there may be different approaches for selecting antenna configurations to provide communication links via a single access point and to provide geofencing. In one embodiment, a Luneburg (or Luneburg) lens may be used as the access point wireless antenna supporting the geofencing communications. A Luneburg lens is a physical object that operates on plane waves to turn plane waves into point-like spherical waves and reciprocally turn point-like spherical waves into plane waves. The Luneburg lens may be constructed as a spherical physical object of a dielectric having the dielectric properties (e.g., dielectric constant) modified or changed as a function of the distance from the sphere's center, r, so that the refraction index is $$n(r) = \sqrt{2 - \left(\frac{r}{R}\right)^2},$$

where R is the radius of the Luneburg lens.

Furthermore, a Luneburg lens is a passive object that acts linearly on electromagnetic waves passing through it and in turn allows superposition of the electromagnetic waves. Such properties enable a Luneburg lens to be used to form and receive a plurality of beams with different boresights by placing excitation or reception apertures on the lens at different positions corresponding to the particular beams' boresights. At millimeter wave frequencies such as in the ISM 60 GHz band, a modest sized lens may be sufficient to support several beams. For example, a Luneburg lens with a diameter greater than ten times the wavelength of the electromagnetic waves propagated through the lens may be used. Accordingly, at 60 GHz, the wavelength is about 0.5 centimeter (cm) and therefore the lens may have a diameter greater than 5 cm.

Geofencing through the use of individual beams of small beamwidth may be used for indoor or outdoor facilities. FIG. 1 shows a wireless geofencing system 10 for a plurality of communication links served by a single access point. In the illustrated embodiment, the wireless geofencing system 10 is applied to an indoor wireless communication application. The wireless geofencing system 10 may include a Luneburg lens antenna system 12 (e.g., the single access point) and a plurality of stations 14, wherein the plurality of stations 14 are communicatively coupled (e.g., wirelessly receiving and transmitting signals and/or data) to the Luneburg lens antenna system 12. In particular, the Luneburg lens antenna system 12 may provide beams for communication links 16 in the 57-64 GHz ISM band toward the plurality of stations 14. A beam may be active (e.g., transmitting a communication signal) or inactive (e.g., not transmitting a communication signal). The Luneburg lens antenna system 12 may include fixed waveguides or an array of microwave patch antennas, which may transmit and receive signals/data in manners as understood in the art. However, it should be noted that an advantage of the array of microwave patch antennas may be the ability to move or form new beams without physically changing the lens excitation/reception aperture structure. For example, the Luneburg lens antenna system 12 may include a patch antenna array 18, which is conformed or adapted to cover a portion or backside of the Luneburg lens' surface with the backplane of the conformed patch antenna array 18 defining a field of regard (FOR) in which objects are able to be detected and tracked. For example, the Luneburg lens antenna system 12 may include the patch antenna array 18 so as to selectively provide coverage between regions by steering the antenna beams 16 away from the undesired regions and toward the target regions (e.g., without physically changing the lens excitation/reception aperture structure).

The plurality of stations 14 may be indoor or outdoor stations within the coverage (e.g., within the coverage of the beams 16) of the Luneburg lens antenna system 12. For example, the plurality of stations 14 may be workstations inside a building. For example, the plurality of stations 14 may be work desks or units in an office area. The plurality of stations 14 may each include a wireless communication unit 20 (e.g., a wireless receiver, receiver/transmitter unit, or a transceiver) to receive wireless communications provided by the beams 16 provided by the Luneburg lens antenna system 12. In the illustrated embodiment, the wireless geofencing system 10 includes six stations, among which, stations 22, 24, 26, and 28 are occupied or in use (e.g., as designated as "O"), and stations 30 and 32 are vacant or not in use (e.g., as designated as "V"). These six stations may receive wireless communications through the six beams 16 provided by the Luneburg lens antenna system 12, including beams 32, 34, 36, 38, 40, and 42. It should be noted that although some stations may be vacant (e.g., not in use or not occupied, as designated as "V"), the Luneburg lens antenna system 12 may still provide beams directed toward the vacant stations. These beams are inactive (e.g., not transmitting a communication signal) or not made active when directed toward vacant stations.

Figure 2:
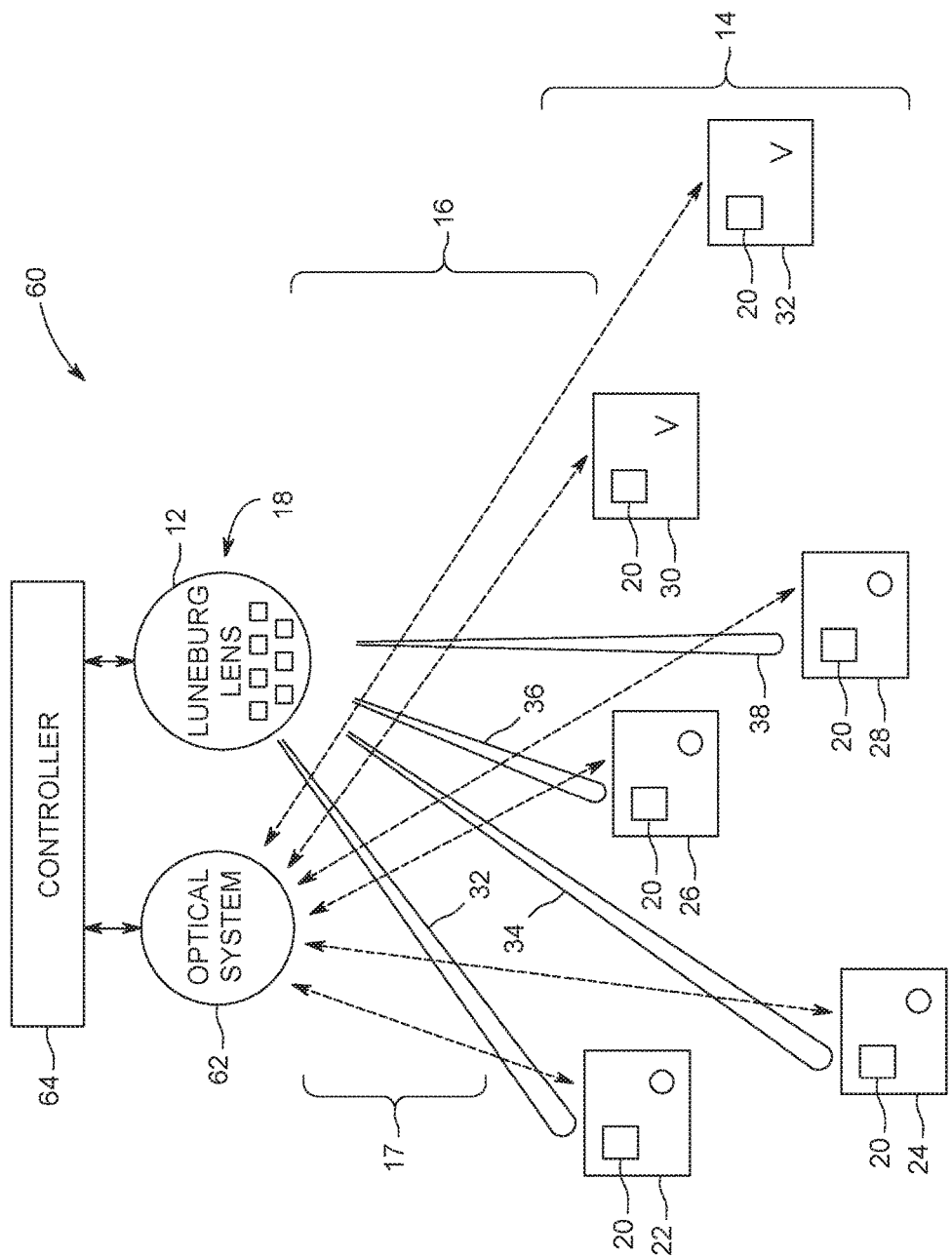
FIG. 2 is a schematic of a selective wireless geofencing system to selectively provide communication links via the single access point, in accordance with an aspect of the present disclosure.

FIG. 2 is a schematic of a selective wireless geofencing system 60 to selectively provide communication links via the single access point. The selective wireless geofencing system 60 may include the Luneburg lens antenna system 12, an optical system 62, a controller 64 configured to operatively coupled to the Luneburg lens antenna system 12 and the optical system 62, and the plurality of stations 14. In the illustrated embodiment, the optical system 62 may be disposed in proximity or adjacent to the Luneburg lens system, and the optical system 62 may interrogate each of the plurality of stations 14 (e.g., as indicated by the plurality of arrows 17) to determine if the station is occupied or vacant. The optical interrogation may be passive or active as will be described in detail below. The information obtained by the optical system 62 is transmitted to the controller 64 (e.g., via wire or wireless communication), and based on the information, the controller 64 may identify an occupancy status (e.g., vacant or occupied) of each of the plurality of stations 14. In some embodiments, each of the plurality of stations 12 may directly send the occupancy status information (e.g., vacant or occupied) to the controller 64 via the wireless communication unit 20. Furthermore, based on the occupancy status information (e.g., sent by the optical system 62 and/or each of the plurality of stations 14), the controller 64 may change the function or operation of the Luneburg lens antenna system 12 (e.g., turning on/off one or more of the beams 16, changing the boresight directions or beam directions of one or more of the beams 16, etc.). For example, the controller 64 may identify that the stations 30 and 32 are vacant and may determine not to provide or stop providing wireless service to the vacant stations 30 and 32 (e.g., only providing beams 32, 34, 36, and 38). As such, the selective wireless geofencing system 60 may selectively provide communication links.

Figure 3:
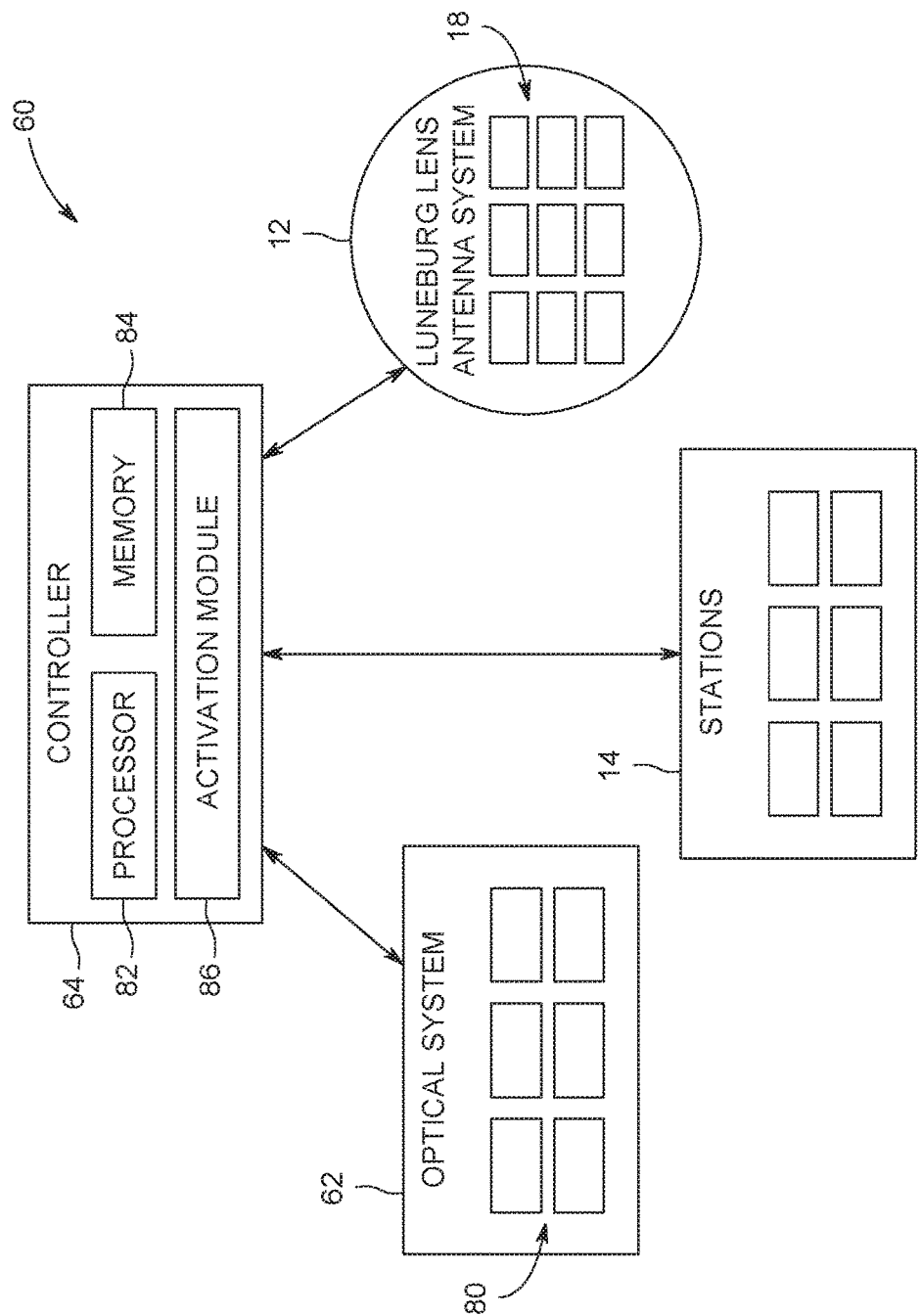
FIG. 3 is a block diagram of the selective wireless geofencing system of FIG. 2, in accordance with an aspect of the present disclosure.

FIG. 3 is a block diagram of the selective wireless geofencing system 60 of FIG. 2. In the illustrated embodiment, the selective wireless geofencing system 60 may include the Luneburg lens antenna system 12, the optical system 62 comprising one or more sensors 80, the plurality of stations 14, and the controller 64 operatively coupled to the Luneburg lens antenna system 12 and the optical system 62. The controller 64 may include a processor 82, a memory 84 (e.g., non-transitory computer-readable medium/memory circuitry) communicatively coupled to the processor 82, and an activation code module 86 stored in the memory 84. The processor 82 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The memory 84 may include volatile memory, such as random access memory (RAM), and/or non-volatile memory, such as read-only memory (ROM), optical drives, hard disc drives, or solid-state drives.

The memory 84 may store one or more sets of instructions (e.g., processor-executable instructions) and algorithms implemented to perform operations related to function or operation of the Luneburg lens antenna system 12 and the optical system 62. For example, the memory 84 may store a model of the Luneburg antenna (e.g., antenna type, configuration of the patch antenna array, orientation, boresight direction, etc.) such that the controller 64 may change the function or operation of the Luneburg lens antenna system 12 (e.g., activating or deactivating one or more of the beams 16, changing the boresight directions or beam directions of one or more of the beams 16, etc.). For example, the memory 84 may store instructions to turn on and off the one or more sensors 80 of the optical system 62. For example, the memory 84 may store instructions to obtain information and collect data using the one or more sensors 80 of the optical system 62. For example, the memory 84 may store the activation code module 86 comprising algorithms to process and analyze information and/or signals(s) collected by the optical system 62 and/or the plurality of stations 14 (e.g., the plurality of stations may directly provide identification or status information to the controller) as to enable a determination of an occupancy status (e.g., vacant or occupied) for each of the plurality of stations 14.

More specifically, the one or more sensors 80 may include motion detection sensor(s), occupancy sensor(s), image sensor(s), identification reader(s), or a combination thereof to perform optical interrogation. The activation module 86 may include algorithms to process and analyze information and data collected by the one or more sensors 80 and/or by the plurality of stations 14 (e.g., transmitted by wireless communication unit 20) to make a determination as to whether each of the plurality of stations 14 is vacant or occupied. For example, the optical interrogation may be passive, which may involve signal processing of a portion of a focal plane image encompassing each of the plurality of stations 14 location. Alternatively, the optical interrogation may be active, which may involve an interrogation optical beam sent by the one or more sensors 80 towards each of the plurality of the stations 14, wherein a portion of the beam is reflected as indicative of the presence of a user at the station (e.g., the station is occupied). For example, the interrogation may involve a readable identification instrument to identify the user. It may be appreciated that the user's identity may be communicated to the controller 64. In certain embodiments, the user's identity may be communicated to a remote facility (e.g., a service platform, cloud service, or other location remote from the controller 64) by the controller 64, and the controller 64 may communicatively couple (e.g., data transfer, receiving and giving instructions) to the remote facility to log the presence of the user's identity. The optical interrogation process and the occupancy status determination process may be performed continuously, or performed at a predetermined interval (e.g., seconds, minutes, hours, etc.). The occupancy status determination process may also be performed upon receiving the user's identity from one of the plurality of the stations 14.

Upon processing and determining the occupancy status (e.g., vacant or occupied) of each of the plurality of stations 14, the controller 64 may change or update the function or operation of the Luneburg lens antenna system 12. For example, upon a determination that one or more stations are occupied or in use, the controller 64 may send instructions to the Luneburg lens antenna system 12 to start providing or continue providing wireless communication service to the one or more occupied stations (e.g., providing the beams 32, 34, 36, and 38 to the stations 22, 24, 26, and 28, respectively). For example, upon a determination that one or more stations are vacant, the controller 64 may send instructions to the Luneburg lens antenna system 12 to stop providing wireless communication service to the one or more vacant stations (e.g., deactivating the beams 40 and 42 to the stations 30 and 32, respectively).

Figure 4:
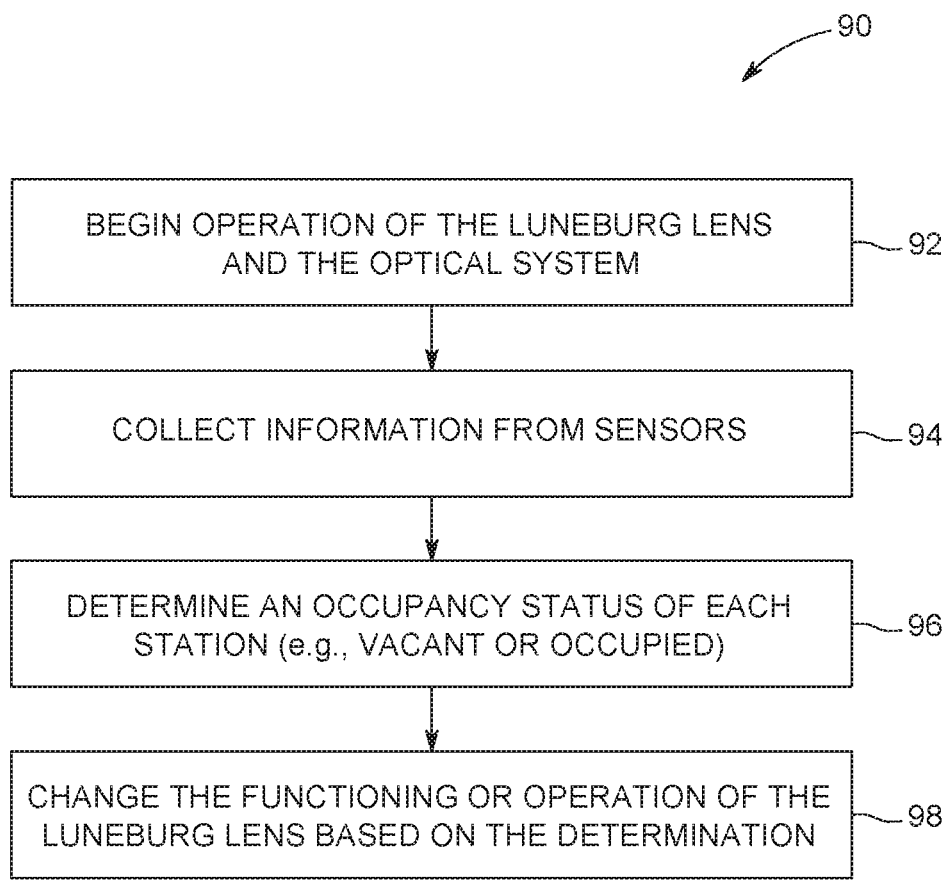
FIG. 4 is flow chart of a process for utilizing the selective wireless geofencing system to selectively provide communication links via the single access point, in accordance with an aspect of the present disclosure.

FIG. 4 is a flow chart illustrating a method 90 for utilizing the selective wireless geofencing system 60 to selectively provide communication links via a single access point. One or more steps of the method 90 may be executed by the controller 64 of the selective wireless geofencing system 60. The method 90 includes beginning operation of the Luneburg lens antenna system 12 and the optical system 62 (step 92), collecting information from sensors (step 94), determining an occupancy status (e.g., vacant or occupied) of each station (step 96), and changing the function or operation of the Luneburg lens based on the determination (step 98). In particular, upon beginning operation of the Luneburg lens antenna system 12, the Luneburg lens antenna system 12 may be initialized and stand-by to provide wireless service to the plurality of stations 14 (e.g., the boresights are aligned toward each of the respective station). Upon beginning operation of the optical system 62, the plurality of sensors 80 of the optical system 62 may be activated and stand-by to collect information or data.

The controller 64 may collect information/data related to an occupancy status (e.g., occupied or vacant) of each of the plurality of stations 14 via one or more sensors (step 94). In particular, the controller 64 may send instructions to the one or more sensors 80 of the optical system 62, such as motion detection sensor(s), occupancy sensor(s), image sensor(s), identification reader(s), or a combination thereof, to collect information/data continuously or at a predetermined interval (e.g., seconds, minutes, hours, etc.). As such, the information/data related to an occupancy status (e.g., occupied or vacant) of each of the plurality of stations 14 is collected when the presence of a user or a user's readable identification instrument is detected at the respective station 14.

The method 90 also includes determining an occupancy status (e.g., occupied or vacant) of each station (step 96) and changing the function or operation of the Luneburg lens based on the determination (step 98). In particular, the activation module 86 of the controller 64 may process and analyze the information/data collected by one or more sensors (e.g., of the optical system 62 or provided at the plurality of stations 14) to determine the occupancy status of each station. It may be appreciated that the process for determining the occupancy status of each station may be performed and updated continuously, or at a predetermined interval (e.g., seconds, minutes, hours, etc.). In some embodiments, the process for determining the occupancy status of each station may also be performed and updated upon a user initiated action such as a user's displaying a readable identification instrument readable by the optical system 62.

Upon determination of the occupancy status (e.g., occupied or vacant), the controller 64 may change the functionality or operation of the Luneburg lens (step 98). For instance, the controller 64 may send instructions to the Luneburg lens antenna system 12 to activate the beams or communication links toward the occupied station(s) and/or deactivate beams or communication links directed toward the vacant station(s). In some embodiments, upon determination of the occupancy status (e.g., occupied or vacant), the controller 64 may send instructions to the Luneburg lens antenna system 12 to activate the beams or communication links toward the occupied station(s) and/or deactivate beams or communication links directed toward the vacant station(s) at a predetermined interval (e.g., seconds, minutes, hours, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a Luneburg lens antenna system configured to selectively provide wireless communication to a plurality of stations;
   one or more sensors configured to collect data related to a presence of a user at each of the plurality of stations; and
   a controller coupled to the Luneburg lens antenna system and the one or more sensors, wherein the controller is configured to determine the presence of the user at each of the plurality of stations based on the data collected by the one or more sensors, and the controller is further configured to change operation of the Luneburg lens antenna system based on the presence of the user at each of the plurality of stations;
   wherein the one or more sensors send an interrogation optical beam towards each of the plurality of the stations, wherein a portion of the interrogation optical beam is reflected as indicative of the presence of the user at the station.

2. The system of claim 1, wherein the Luneburg lens antenna system is configured to transmit or receive signals for sixty gigahertz millimeter wave communication.

3. The system of claim 1, wherein the one or more sensors comprise motion detection sensors, occupancy sensors, image sensors, or a combination thereof.

4. The system of claim 3, wherein the one or more sensors are part of an optical system operably coupled to the controller, wherein the optical system is disposed adjacent to the Luneburg lens antenna system.

5. The system of claim 1, wherein the one or more sensors comprise identification readers.

6. The system of claim 5, wherein data collected by the identification readers is communicated to a remote facility by the controller.

7. The system of claim 1, wherein the controller comprises an activation code module to determine the presence of the user at each of the plurality of stations.

8. The system of claim 1, wherein changing the operation of the Luneburg lens antenna system comprises activating one or more antenna beams directed toward one or more stations of the plurality of stations that are determined to be occupied.

9. The system of claim 1, wherein changing the operation of the Luneburg lens antenna system comprises deactivating one or more antenna beams directed toward one or more stations of the plurality of stations that are determined to be vacant.

10. The system of claim 1, wherein the controller is configured to determine the presence of the user at each of the plurality of stations continuously or at a predetermined interval.

11. The system of claim 1, wherein the controller is configured to change operation of the Luneburg lens antenna system upon a determination of the presence of the user at each of the plurality of stations.

12. The system of claim 1, wherein the controller is configured to change the boresight directions of one or more beams of the Luneburg lens antenna system.

13. A system comprising:
    a Luneburg lens antenna system configured to selectively provide wireless communication to a plurality of stations;
    an optical system adjacent to the Luneburg lens antenna system, comprising one or more sensors configured to collect data related to a presence of the user at each of the plurality of stations;
    a memory; and
    a processor configured to execute instruction stored on the memory comprising instructions for:
      determining the presence of the user at each of the plurality of stations; and
      changing operation of the Luneburg lens antenna system based on the presence of the user at each of the plurality of stations;
      wherein the one or more sensors send an interrogation optical beam towards each of the plurality of the stations, wherein a portion of the interrogation optical beam is reflected as indicative of the presence of the user at the station.

14. The system of claim 13, wherein the Luneburg lens antenna system is configured to communicate signals for sixty gigahertz millimeter wave communication.

15. The system of claim 13, wherein the one or more sensors comprise motion detection sensors, occupancy sensors, image sensors, or a combination thereof.

16. The system of claim 13, comprising a plurality of identification readers communicatively coupled to the processor and configured to collect data related to the presence of the user at each of the plurality of stations.

17. The system of claim 13, wherein changing the operation of the Luneburg lens antenna system comprises providing one or more antenna beams directed toward one or more stations of the plurality of stations that are determined to be occupied.

18. The system of claim 13, wherein changing the operation of the Luneburg lens antenna system comprises deactivating one or more antenna beams directed toward one or more stations of the plurality of stations that are determined to be vacant.

19. A method for providing geofencing in single access point wireless communication comprising:
- determining a presence of the user at each of a plurality of stations based on data collected via one or more sensors; and
- changing operation of a Luneburg lens antenna system based on the presence of the user at each of the plurality of stations;
- wherein determining the presence of the user comprises sending an interrogation optical beam towards each of the plurality of the stations, wherein a portion of the interrogation optical beam is reflected as indicative of the presence of the user at the station.

20. The method of claim 19, wherein changing operation of the Luneburg lens comprises activating one or more antenna beams toward only one or more stations of the plurality of stations that are determined to be occupied.

21. The method of claim 19, wherein the Luneburg antenna system is configured to transmit or receive signals for sixty gigahertz millimeter wave communication.

\* \* \* \* \*